US005501170A

United States Patent [19]

Walsh

[11] Patent Number: 5,501,170

[45] Date of Patent: Mar. 26, 1996

[54] GRADING STAKE WITH INDICATOR FLAG

[76] Inventor: Sylvia Walsh, 1497 Via Manzanas, San Lorenzo, Calif. 94580

[21] Appl. No.: 261,997

[22] Filed: Jun. 17, 1994

[51] Int. Cl.[6] ..................... G09F 17/00; G01D 21/00

[52] U.S. Cl. ..................... 116/209; 116/173

[58] Field of Search ..................... 116/200, 209, 116/173; 248/530; 15/105, 159.1, 171, 174, 207

[56] References Cited

U.S. PATENT DOCUMENTS

| | | | |
|---|---|---|---|
| 56,750 | 7/1866 | Hiss | 15/174 |
| 1,928,990 | 10/1933 | Barnett et al. | 15/190 |
| 2,506,197 | 5/1950 | Burger . | |
| 2,810,977 | 10/1957 | Barry . | |
| 3,162,880 | 12/1964 | Francis . | |
| 3,267,901 | 8/1966 | Carroll | 116/209 |
| 3,903,835 | 9/1975 | Carroll . | |
| 4,120,115 | 11/1978 | Mushkin | 15/207 |
| 4,550,468 | 11/1985 | Nelson | 15/147.1 |
| 5,003,735 | 4/1991 | Bates . | |
| 5,044,303 | 9/1991 | Culver, Jr. . | |
| 5,174,237 | 12/1992 | Beard | 116/209 |
| 5,218,733 | 6/1993 | Leu | 15/146 |

*Primary Examiner*—William A. Cuchlinski, Jr.
*Assistant Examiner*—Andrew Hirshfeld
*Attorney, Agent, or Firm*—Bielen, Peterson & Lampe

[57] ABSTRACT

A grading stake with an indicator flag wherein the grading stake is constructed with a pointed stake member with a top end and a bundle of colored filaments fastened at one end to the top end of the stake member by a tape wrap of high-strength tape wound around the end of the bundle of colored filaments and the top end of the stake member.

4 Claims, 1 Drawing Sheet

GRADING STAKE WITH INDICATOR FLAG

BACKGROUND OF THE INVENTION

This invention relates to a grading stake and more particularly to a grading stake having an indicator flag. Grading stakes are used to indicate the level to which a terrain must be graded. The stakes are customarily driven to a specified level relative to the existing surface and frequently include a brightly painted top to indicate the existence of the stake top and the level to which the surface ground is to be cut or filled.

Although the top of grading stakes may be initially visible, for example, when the stake top is above the existing ground or is set in a small hand-dug hole, the stakes are frequently covered during the passes of the grader. To improve the visibility of the grading stake, a flag comprising a bundle of brightly colored, polymer filaments is attached to the top end of the stake. In this manner, the colored flag or whiskers will first appear before the top of the stake is reached. The operator of the grader machine can then user greater care in approaching the subsurface top of the grading stake.

In prior art grading stakes, such as that described in U.S. Pat. No. 3,903,835, entitled GRADE INDICATOR STAKE FLAG HOLDER, issued 9 Sep. 1975, the flag or filament bundle is folded at the center and retained by a metal crimp band. The band includes a staple device for attaching the banded filaments to the top of a wooden stake by driving the staple device into the top of the stake. Unfortunately, driving the staple device into the top of the stake frequently splits the stake and slows production, as well as wastes material. It has also been proposed that a conventional staple be driven into the side of a wooden stake proximate the stake top to retain the banded filaments to the stake. While this reduces splitting of the stake, such splitting still does occur and it is somewhat difficult to attach the indicator flag to a round wooden stake of relatively small diameter. Additionally, when in place, the environmental conditions of damp ground, rain water and other adverse elements can more readily penetrate the stake at the staple holes and result in splitting of the stake or loosening of the flag such that it becomes detached upon contact with the grader blade. Similarly, repeated contact with the grader blade may dislodge the indicator flag since the direction of the grader blade may be directly opposite the insertion portion of the connection staple.

To avoid the various problems of utilizing an indicator flag that is attached to a grading stake by an attachment means that penetrates the stake, an inexpensive and simple system has been devised for attaching the indicator flag to the grading stake. The solution wholly eliminates the problem of splitting wooden stakes and prevents the indicator flag from being detached under field conditions. The improved grading stake with an indicator flag is described in the following Summary of the Invention and in the Detailed Description of the Preferred Embodiments as follows.

SUMMARY OF THE INVENTION

This invention relates to a grading stake with a flag indicator in which the flag indicator is fabricated from a looped and banded bundle of brightly-colored, polymer filaments. The filaments are folded and fastened by a tape band and attached to the top of a grading stake by a tape wrap. The tape wrap is wound around the looped end of the filaments and the top end of the stake. The tape wrap is preferably fabricated from a water-proof, high-strength, filament tape. The filament tape, being wrapped around both the top of the stake and the looped bottom of the indicator feather, prevents splitting of the stake and allows the filaments to be repeatedly bent by the grading blade to a horizontal position without being sheared. The improved grading stake with band attached indicator flag can be fabricated from square or round wooden stake members with equal results.

DETAILED DESCRIPTION OF THE PREFERRED EMBODIMENTS

Figure 1:
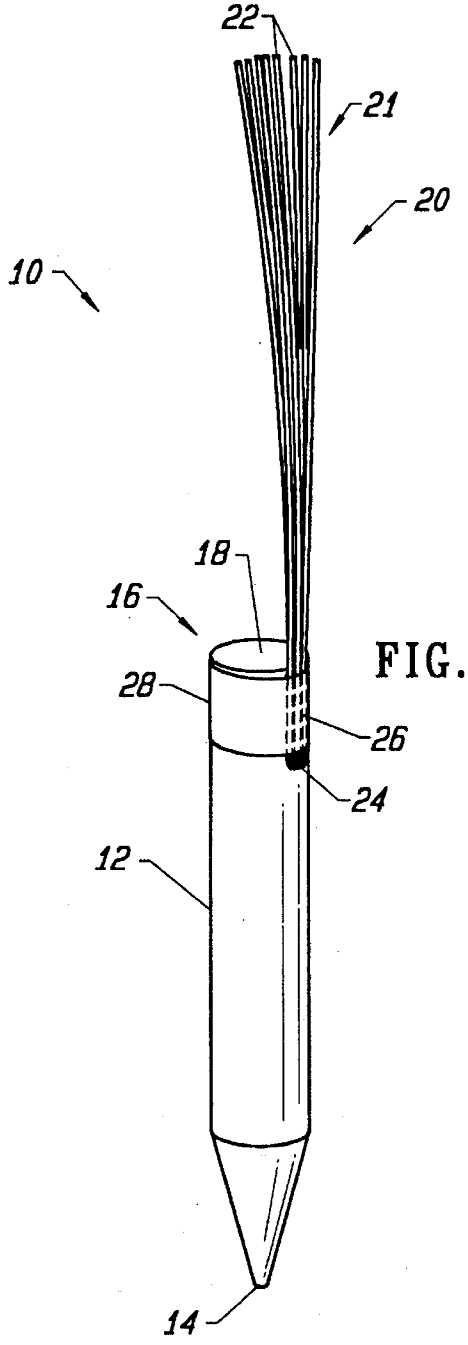
FIG. 1 is a perspective view of the grading stake with indicator flag.

Referring now to FIG. 1, a grading stake with indicator flag is designated generally by the reference numeral 10. The grading stake comprises a wooden stake member, shown here as a dowel 12 having a conically turned, pointed end 14 to enable the stake 10 to be easily driven into the ground. A top end 16 of the stake includes a flat top 18 that may be brightly colored to indicate the grade level that the ground is to be cut or filled by conventional grading equipment. Connected to the top end 16 of the stake 10 is a flag 20 that is comprised of a bundle of polymer, monofilaments 21 that are brightly colored to signal the location of the stake 10. The projecting filaments or "whiskers" may be of different length, for example, six inches or twelve inches depending on the amount of warning desired by the grader operator. Similarly, the stake member 12 may be of different length depending on the type of soil and the use of the stake in a subsurface, or above surface setting. The flagged grading stake 10 is fabricated using a wooden stake member having a circular, square or rectangular cross section, if desired.

Figure 2:
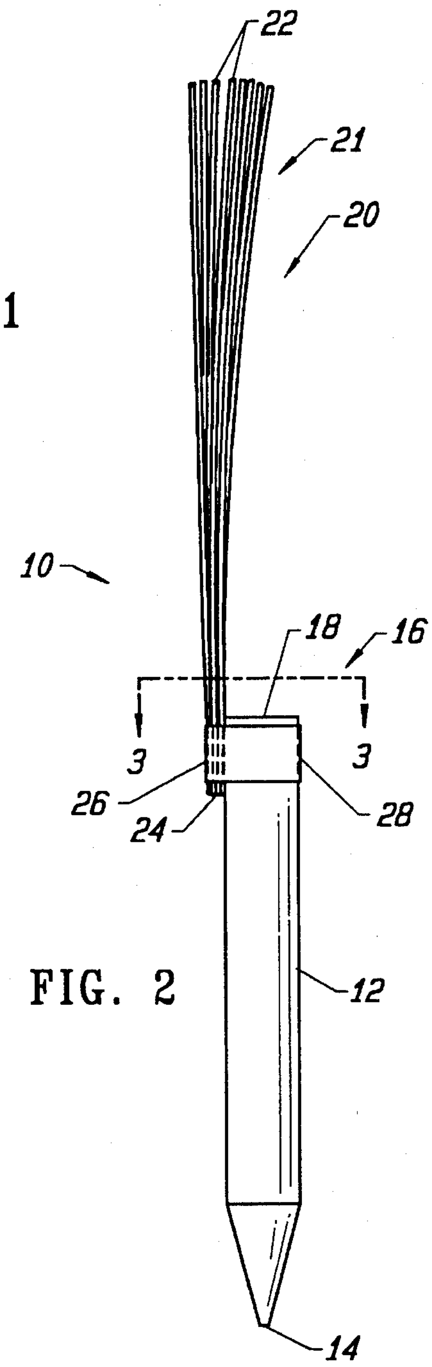
FIG. 2 is a side elevational view of the grading stake of FIG. 1.
Figure 3:
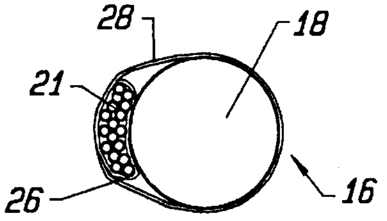
FIG. 3 is a top view taken on the lines 3,3 in FIG. 2.

The improvement of this invention is the means to attach the filament bundle 21 to the dowel 12. The filament bundle 21 is constructed with a plurality of individual filaments 22 having a looped end 24 that is crimped and held by a ⅜" tape band 26 to form the flag 20. The looped end of the filament bundle 21 is attached to the top end 16 of the stake member 12 by a further 1" tape wrap 28 formed of a high strength, filament-impregnated, packing tape. The tape wrap 28 is wound a multiple number of turns around the top end 16 of the stake member 12 and the crimped end 24 of the filament bundle 21. As shown in FIGS. 2 and 3, the filament bundle 21 is fastened to only a portion of the perimeter of the top end 16 of the stake member 12 in order that the flat top 18 is not obscured from measurement taking by the projecting filaments of the filament bundle. The tape wrap 28 is preferably displaced a short distance from the top 18 of the stake member 12 such that it does not interfere with accurate measurements to the top of the flagged grading stake. Additionally, the slight displacement from the top of the stake 18 provides greater flexibility for the filament bundle 21 to bend in a horizontal position when contacted by the blade of a grader machine. The tape wrap 28 may be fabricated from a brightly colored tape to provide a visual cue to the top of the stake, when the stake end is exposed.

The construction of the flagged grading stake using a looped filament bundle taped to the stake member substantially improves the assembly process and eliminates waste. The attachment of a filament bundle by staples or other means that are driven into the end of the stake is eliminated. In addition to avoiding splitting of the stake during assembly, the tape wrap inhibits splitting when the stake is driven into the ground or remains in the ground under adverse environmental conditions.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A grading stake having an indicator flag comprising:

a) a stake member having a pointed end, and an opposite top end with a side and a top;

b) a filament bundle having an attachment end, wherein the attachment end is attached to the side of the top end of the stake member, wherein the stake member has a perimeter and the filament bundle is attached to only a portion of the perimeter wherein the top of the stake member is not obscured from measurement taking by the filament bundle;

c) attachment means for attaching the filament bundle to the stake member wherein the attachment means comprises a tape wrap wound at least once around the top end of the stake member and the attachment end of the filament bundle wherein filament bundle comprises a plurality of polymer monofilaments having projecting ends and a middle that is looped and retained with a band forming said attachment end, wherein the banded filament bundle is attached along the side of the stake member with the tape wrap wound around both the banded attachment end of the filament bundle and the side of the top end of the stake member with the projecting ends of the monofilaments projecting from the top of the stake member and with the tape wrap being displaced a short distance from the top of the stake member for measurement taking.

2. The grading stake of claim 1 wherein the top of the stake member is flat and brightly colored.

3. The grading stake of claim 1 wherein the tape wrap comprises a filament tape.

4. The grading stake of claim 1 wherein the stake member is wood.

* * * * *